United States Patent
Huggins

(10) Patent No.: US 10,701,942 B2
(45) Date of Patent: Jul. 7, 2020

(54) INSECT REPELLANTS AND METHODS OF MAKING AND USING THE SAME

(71) Applicant: John Huggins, Tifton, GA (US)

(72) Inventor: John Huggins, Tifton, GA (US)

( * ) Notice: Subject to any disclaimer, the term of this patent is extended or adjusted under 35 U.S.C. 154(b) by 149 days.

(21) Appl. No.: 16/108,154

(22) Filed: Aug. 22, 2018

(65) Prior Publication Data

US 2019/0059393 A1     Feb. 28, 2019

Related U.S. Application Data

(60) Provisional application No. 62/549,178, filed on Aug. 23, 2017.

(51) Int. Cl.
| | | |
|---|---|---|
| *A01N 65/00* | (2009.01) | |
| *A01N 65/26* | (2009.01) | |
| *A01N 65/44* | (2009.01) | |
| *A01N 65/22* | (2009.01) | |
| *A01N 65/28* | (2009.01) | |
| *A01N 65/08* | (2009.01) | |
| *A01N 65/40* | (2009.01) | |

(52) U.S. Cl.
CPC ............. *A01N 65/26* (2013.01); *A01N 65/00* (2013.01); *A01N 65/08* (2013.01); *A01N 65/22* (2013.01); *A01N 65/28* (2013.01); *A01N 65/40* (2013.01); *A01N 65/44* (2013.01)

(58) Field of Classification Search
CPC ..................................................... A01N 65/00
See application file for complete search history.

(56) References Cited

U.S. PATENT DOCUMENTS

2014/0220164 A1\*   8/2014   Manhas ................. A01N 35/04
                                                                        424/736

\* cited by examiner

*Primary Examiner* — Rosanne Kosson
(74) *Attorney, Agent, or Firm* — Withers & Keys, LLC

(57) ABSTRACT

Insect repellants are disclosed. Methods of making and using insect repellants are also disclosed.

17 Claims, No Drawings

INSECT REPELLANTS AND METHODS OF MAKING AND USING THE SAME

CROSS-REFERENCE TO RELATED APPLICATIONS

This patent application claims the benefit of priority to U.S. Provisional Patent Application Ser. No. 62/549,178 filed on Aug. 23, 2017 and entitled "INSECT REPELLANTS AND METHODS OF MAKING AND USING THE SAME," the subject matter of which is hereby incorporated by reference in its entirety.

FIELD OF THE INVENTION

The present invention is directed to insect repellants and methods of making and using the same.

BACKGROUND

Efforts continue to further develop insect repellants that are effective against a variety of insects including, but not limited to, mosquitos, gnats, yellow flies, biting midges (also known as no-see-ums, midgies, sand flies, and punkies) and any combination thereof.

SUMMARY

The present invention addresses some of the efforts discussed above by the discovery of new insect repellants and methods of making and using the same. The new insect repellants comprise all natural essential oils that have no harmful effects when applied onto a user's skin and/or clothing. The new insect repellants do not contain (i) any diethyl toluamide (or N,N-diethyl-3-methylbenzamide or DEET) or any other known synthetic insecticide, (ii) any added alcohol other than any alcohol present within one of the essential oils, or (iii) any other harmful ingredients.

Accordingly, the present invention is directed to insect repellants. In some exemplary embodiments, the insect repellant comprises a mixture of: (i) neem oil, (ii) peppermint oil, (iii) vanilla oil, (iv) citronella oil, (v) lemon-eucalyptus oil, and (vi) water. In some exemplary embodiments, the insect repellant consists essentially of a mixture of: (i) neem oil, (ii) peppermint oil, (iii) vanilla oil, (iv) citronella oil, (v) lemon-eucalyptus oil, and (vi) water. In some exemplary embodiments, the insect repellant consists of a mixture of: (i) neem oil, (ii) peppermint oil, (iii) vanilla oil, (iv) citronella oil, (v) lemon-eucalyptus oil, and (vi) water.

The present invention is further directed to methods of making insect repellants. In one exemplary embodiment, the method of making an insect repellant comprises: forming a mixture comprising (or consists essentially of, or consists of): (i) neem oil, (ii) peppermint oil, (iii) vanilla oil, (iv) citronella oil, (v) lemon-eucalyptus oil, and (vi) water.

The present invention further relates to methods of using insect repellants. In one exemplary embodiment, the method of using an insect repellant comprises: applying a mixture onto a surface, the mixture comprising (or consists essentially of, or consists of): (i) neem oil, (ii) peppermint oil, (iii) vanilla oil, (iv) citronella oil, (v) lemon-eucalyptus oil, and (vi) water. The method of using an insect repellant may further comprise shaking the mixture prior to applying.

These and other features and advantages of the present invention will become apparent after a review of the following detailed description of the disclosed embodiments and the appended claims.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to insect repellants. The present invention is further directed to methods of making insect repellants. The present invention is even further directed to methods of using insect repellants.

The insect repellants and methods of making and using insect repellants of the present invention are further described in the following embodiments.

EMBODIMENTS

Insect Repellants

1. An insect repellant comprising: a mixture of: (i) neem oil, (ii) peppermint oil, (iii) vanilla oil, (iv) citronella oil, (v) lemon-eucalyptus oil, and (vi) water.
2. An insect repellant consisting essentially of a mixture of: (i) neem oil, (ii) peppermint oil, (iii) vanilla oil, (iv) citronella oil, (v) lemon-eucalyptus oil, and (vi) water.
3. An insect repellant consisting of a mixture of: (i) neem oil, (ii) peppermint oil, (iii) vanilla oil, (iv) citronella oil, (v) lemon-eucalyptus oil, and (vi) water.
4. The insect repellant of any one of embodiments 1 to 3, wherein (i) said neem oil is present in an amount greater than 0 up to about 6.0 ounces (oz) (or any value between 0 and 6.0, in increments of 0.1 oz, e.g., 2.1 oz, or any range of values between 0 and 6.0, in increments of 0.1 oz, e.g., from 1.6 oz to 5.5 oz), (ii) said peppermint oil is present in an amount greater than 0 up to about 4.0 ounces (oz) (or any value between 0 and 4.0, in increments of 0.1 oz, e.g., 2.1 oz, or any range of values between 0 and 4.0, in increments of 0.1 oz, e.g., from 1.6 oz to 3.5 oz), (iii) said vanilla oil is present in an amount greater than 0 up to about 4.0 ounces (oz) (or any value between 0 and 4.0, in increments of 0.1 oz, e.g., 2.1 oz, or any range of values between 0 and 4.0, in increments of 0.1 oz, e.g., from 1.6 oz to 3.5 oz), (iv) said citronella oil is present in an amount greater than 0 up to about 2.0 ounces (oz) (or any value between 0 and 2.0, in increments of 0.1 oz, e.g., 1.1 oz, or any range of values between 0 and 2.0, in increments of 0.1 oz, e.g., from 0.9 oz to 1.5 oz), and (v) said lemon-eucalyptus oil is present in an amount greater than 0 up to about 2.0 ounces (oz) (or any value between 0 and 2.0, in increments of 0.1 oz, e.g., 1.1 oz, or any range of values between 0 and 2.0, in increments of 0.1 oz, e.g., from 0.9 oz to 1.5 oz), for each gallon of (vi) water.
5. The insect repellant of any one of embodiments 1 to 4, wherein (i) said neem oil is present in an amount of 4.0 oz, (ii) said peppermint oil is present in an amount of 2.0 oz, (iii) said vanilla oil is present in an amount of 2.0 oz, (iv) said citronella oil is present in an amount of 1.0 oz, and (v) said lemon-eucalyptus oil is present in an amount of 1.0 oz, for each gallon of (vi) water.

6. The insect repellant of any one of embodiments 1 to 5, wherein (i) said neem oil comprises neem oil (virgin organic) commercially available from Jedwards International, Inc. (Braintree, Mass.) (e.g., Item S1317 from Jedwards), (ii) said peppermint oil comprises peppermint oil (organic *Arvensis*) commercially available from Jedwards International, Inc. (Braintree, Mass.) (e.g., Item E1020 from Jedwards, or alternatively, peppermint oil (organic *Piperita*) Item E1025 from Jedwards, or alternatively, Item E1015 or Item E1016 from Jedwards), (iii) said vanilla oil comprises vanilla oil (Madagascar organic) commercially available from Jedwards International, Inc. (Braintree, Mass.) (e.g., Item PHM4100 from Jedwards, or alternatively, Item PHM4110 from Jedwards), (iv) said citronella oil comprises citronella oil (organic) commercially available from Jedwards International, Inc. (Braintree, Mass.) (e.g., Item E1211 from Jedwards, or alternatively, Item E1210 from Jedwards), and (v) said lemon-eucalyptus oil comprises lemon-eucalyptus or eucalyptus oil (citriodora) (i.e., steam distilled from the leaves of the *Corymbia citriodora* tree) commercially available from Jedwards International, Inc. (Braintree, Mass.) (e.g., Item E1057 from Jedwards).

7. The insect repellant of any one of embodiments 1 to 6, wherein said insect repellant does not contain (i) any diethyl toluamide (or N,N-diethyl-3-methylbenzamide or DEET) or any other known synthetic insecticide, (ii) any added alcohol other than any alcohol present within one of the essential oils, or (iii) any other harmful ingredients. For example, commercially available vanilla oil may comprise an alcohol such as organic ethyl alcohol (e.g., each of the above-mentioned vanilla oils commercially available from Jedwards International, Inc. (Braintree, Mass.) comprise water, organic ethyl alcohol (35%), and organic vanilla beans extractives).

8. The insect repellant of any one of embodiments 1 to 2 and 4 to 7, wherein said insect repellant comprises organic ethyl alcohol that is present in said vanilla oil.

9. The insect repellant of embodiment 8, wherein said insect repellant consisting essentially of a mixture of: (i) neem oil, (ii) peppermint oil, (iii) vanilla oil with organic ethyl alcohol therein, (iv) citronella oil, (v) lemon-eucalyptus oil, and (vi) water.

10. The insect repellant of embodiment 8, wherein said insect repellant consists of a mixture of: (i) neem oil, (ii) peppermint oil, (iii) vanilla oil with organic ethyl alcohol therein, (iv) citronella oil, (v) lemon-eucalyptus oil, and (vi) water.

11. The insect repellant of any one of embodiments 8 to 10, wherein said organic ethyl alcohol is present in an amount up to about 35 weight percent (wt %), based on a total weight of said vanilla oil.

Methods of Making Insect Repellants

12. A method of making the insect repellant of any one of embodiments 1 to 11, said method comprising: combining (i) the neem oil, (ii) the peppermint oil, (iii) the vanilla oil, (iv) the citronella oil, (v) the lemon-eucalyptus oil, and (vi) the water 13. The method of embodiment 12, wherein said combining step comprises adding each oil into the water while mixing.

Methods of Using Insect Repellants

14. A method of using the insect repellant of any one of embodiments 1 to 11, said method comprising: applying the mixture onto a surface.

15. The method of embodiment 14, wherein the surface is skin, clothing or both.

16. The method of embodiment 14 or 15, further comprising: shaking the mixture prior to said applying step.

17. The method of any one of embodiments 14 to 16, wherein said applying step reduces or eliminates insect bites from insects including, but not limited to, mosquitos, gnats, yellow flies, biting midges (also known as no-see-urns, midgies, sand flies, and punkies) and any combination thereof.

It should be understood that although the above-described insect repellants and methods are described as "comprising" one or more components or steps, the above-described insect repellants and methods may "comprise," "consists of" or "consist essentially of" any of the above-described components or steps of the multiple item insect repellants and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, an insect repellant and/or method that "comprises" a list of elements (e.g., components or steps) is not necessarily limited to only those elements (or components or steps), but may include other elements (or components or steps) not expressly listed or inherent to the insect repellant and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define an insect repellant and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of."

Further, as used herein, (1) the phrase "consists of" or "consisting of" excludes, from the claimed invention, any and all additional materials, steps, features, components, and/or elements that are not specifically recited in a claim after the phrase "consists of" or "consisting of" and (2) the phrase "consists essentially of" or "consisting essentially of"

(a) excludes any additional materials, steps, features, components, and/or elements that are not specifically recited in a claim after the phrase "consists essentially of" or "consisting essentially of," but (b) does not exclude any impurities within a given component (e.g., vanilla oil or peppermint oil or water) that is unintentionally present in the given component in an amount less than 0.05 wt %, desirably, less than 0.03 wt %, and more desirably, less than 0.01 wt %)

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Insect repellants and methods, as described in embodiments 1 to 17, were prepared and used on adults and children. The insect repellants were found to be effective against insects including, but not limited to, mosquitos, gnats, yellow flies, biting midges (also known as no-see-ums, midgies, sand flies, and punkies) and any combination thereof.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An insect repellant comprising: a mixture of, in effective amounts: (i) neem oil, (ii) peppermint oil, (iii) vanilla oil, (iv) citronella oil, (v) lemon-eucalyptus oil, and (vi) water.

2. An insect repellant consisting essentially of a mixture of, in effective amounts: (i) neem oil, (ii) peppermint oil, (iii) vanilla oil, (iv) citronella oil, (v) lemon-eucalyptus oil, and (vi) water.

3. An insect repellant consisting of a mixture of, in effective amounts: (i) neem oil, (ii) peppermint oil, (iii) vanilla oil, (iv) citronella oil, (v) lemon-eucalyptus oil, and (vi) water.

4. The insect repellant of claim 1, wherein (i) said neem oil is present in an amount greater than 0 up to 6.0 ounces (oz), (ii) said peppermint oil is present in an amount greater than 0 up to 4.0 oz, (iii) said vanilla oil is present in an amount greater than 0 up to 4.0 oz, (iv) said citronella oil is present in an amount greater than 0 up to 2.0 oz, and (v) said lemon-eucalyptus oil is present in an amount greater than 0 up to 2.0 oz, for each gallon of (vi) water.

5. The insect repellant of claim 1, wherein (i) said neem oil is present in an amount of 4.0 oz, (ii) said peppermint oil is present in an amount of 2.0 oz, (iii) said vanilla oil is present in an amount of 2.0 oz, (iv) said citronella oil is present in an amount of 1.0 oz, and (v) said lemon-eucalyptus oil is present in an amount of 1.0 oz, for each gallon of (vi) water.

6. The insect repellant of claim 1, wherein (i) said neem oil comprises neem oil (virgin organic), (ii) said peppermint oil comprises peppermint oil (organic *Arvensis*) or alternatively, peppermint oil (organic *Piperita*), (iii) said vanilla oil comprises vanilla oil (Madagascar organic), (iv) said citronella oil comprises citronella oil (organic), and (v) said lemon-eucalyptus oil comprises lemon-eucalyptus or eucalyptus oil (*citriodora*).

7. The insect repellant of claim 1, wherein said insect repellant does not contain (i) any diethyl toluamide (or N,N-diethyl-3-methylbenzamide or DEET), (ii) any other known synthetic insecticide, or (iii) any added alcohol other than any alcohol present within one of the essential oils.

8. The insect repellant of claim 1, wherein said insect repellant comprises organic ethyl alcohol that is present in said vanilla oil.

9. The insect repellant of claim 8, wherein said insect repellant consists essentially of a mixture of: (i) neem oil, (ii) peppermint oil, (iii) vanilla oil with organic ethyl alcohol therein, (iv) citronella oil, (v) lemon-eucalyptus oil, and (vi) water.

10. The insect repellant of claim 8, wherein said insect repellant consists of a mixture of: (i) neem oil, (ii) peppermint oil, (iii) vanilla oil with organic ethyl alcohol therein, (iv) citronella oil, (v) lemon-eucalyptus oil, and (vi) water.

11. The insect repellant of claim 8, wherein said organic ethyl alcohol is present in an amount up to 35 weight percent (wt %), based on a total weight of said vanilla oil.

12. A method of making the insect repellant of claim 1, said method comprising:
combining (i) the neem oil, (ii) the peppermint oil, (iii) the vanilla oil, (iv) the citronella oil, (v) the lemon-eucalyptus oil, and (vi) the water, wherein said combining step comprises adding each oil into the water while mixing.

13. A method of repelling insects from a surface with the insect repellant composition of claim 1, said method comprising: applying an effective amount of the composition onto the surface.

14. The insect repellant of claim 9, wherein (i) said neem oil is present in an amount greater than 0 up to 6.0 ounces (oz), (ii) said peppermint oil is present in an amount greater than 0 up to 4.0 oz, (iii) said vanilla oil with organic ethyl alcohol therein is present in an amount greater than 0 up to 4.0 oz, (iv) said citronella oil is present in an amount greater than 0 up to 2.0 oz, and (v) said lemon-eucalyptus oil is present in an amount greater than 0 up to 2.0 oz, for each gallon of (vi) water.

15. The insect repellant of claim 14, wherein said organic ethyl alcohol is present in an amount up to 35 weight percent (wt %), based on a total weight of said vanilla oil.

16. The insect repellant of claim 10, wherein (i) said neem oil is present in an amount greater than 0 up to 6.0 ounces (oz), (ii) said peppermint oil is present in an amount greater than 0 up to 4.0 oz, (iii) said vanilla oil with organic ethyl alcohol therein is present in an amount greater than 0 up to 4.0 oz, (iv) said citronella oil is present in an amount greater than 0 up to 2.0 oz, and (v) said lemon-eucalyptus oil is present in an amount greater than 0 up to 2.0 oz, for each gallon of (vi) water.

17. The insect repellant of claim 16, wherein said organic ethyl alcohol is present in an amount up to 35 weight percent (wt %), based on a total weight of said vanilla oil.

\* \* \* \* \*